May 24, 1960   G. HAFENSTEINER   2,937,552
FEED AND CONTROL DEVICE FOR SPINDLE-DRIVEN MACHINES
Filed April 22, 1957
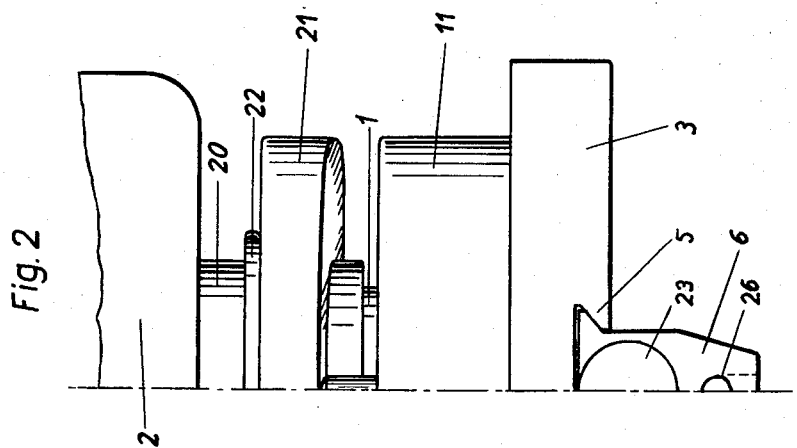
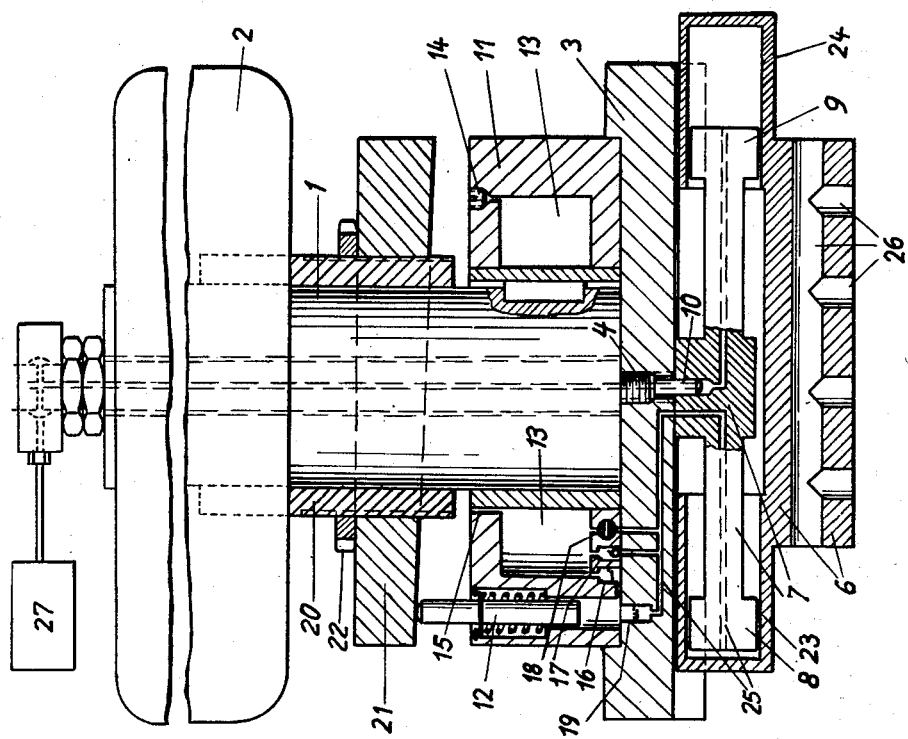
INVENTOR
GEORG HAFENSTEINER
BY Dicke and Craig
ATTORNEYS.

United States Patent Office 2,937,552
Patented May 24, 1960

2,937,552

FEED AND CONTROL DEVICE FOR SPINDLE-DRIVEN MACHINES

Georg Hafensteiner, Munich, Germany, assignor to Bayerische Motoren Werke Aktiengesellschaft, Munich, Germany Filed Apr. 22, 1957, Ser. No. 654,127

Claims priority, application Germany Apr. 20, 1956

3 Claims. (Cl. 82—1)

The present invention relates to a control and feed device attached to rotating spindles of, for instance, milling machines and boring or drilling machines for machining bulky work pieces especially for facing and relieving operations whereby the radial feed movement, induced by the control and feed device, is transmitted to the tool which is attached to the device.

Such devices are known in the prior art in which the part which carries the tool is moved radially in relation to the member that is fastened to the spindle by means of built-in mechanical gears or change-speed transmissions. The operating accuracy demanded, the limited space usually available, the light weight ordinarily sought in the construction, and the requirement of a number of different feed velocities make such a change-speed transmission and therewith the entire fixture extremely expensive.

Another disadvantage encountered in the prior art devices is the lengthy resetting of the tool carriage by hand and the requirement for maintaining one part of the device stationary, which in most cases is done by hand, for the purpose of initiating the feed movement which entails additionally a certain accident hazard to the operating personnel. For these reasons, such prior art devices were not well suited for use in mass production.

In contrast thereto, the present invention proposes a control and feed device referred to hereinafter simply as "device" which is considerably simpler and therefore cheaper to build, largely automatic and, therefore, well suited in its use for mass production for facing and relieving of especially bulky work pieces and which is attached in any well-known manner to rotating spindles of, for instance, milling machines or boring or drilling machines and in which the tool carrier carries out the radial feed and return movements which may be produced in accordance with the present invention hydraulically and/or pneumatically. The forces for the feed and return movement are applied to the tool carrier by means of pressure cylinders connected with the tool carrier and housing of the device and supplied with pressure oil and/or compressed air which are placed under pressure in the housing of the device itself or which are supplied thereto from the outside.

The oil pressure may be produced in the rotating housing of the device by an oil pump advantageously having a variable pump-output characteristic whereby the oil reservoir is also built into the housing of the device. Especially advantageous is the use of a plunger or piston-type pump in which the plungers or pistons, protruding from the housing, are actuated by a cam in a known manner, in which the cam is preferably fastened to a stationary part of the machine, and in which the space between the cam and the rotating housing of the device is adjustable to vary the output of the pump. To produce the feed movement the pressure oil is delivered from the oil pump to the feed cylinder over a check or relief valve.

In order to prevent excessive pressures and forces, the oil lines and oil reservoir are in communication with each other over a pressure limiting or excess-pressure valve. At the same time a controllable return valve is arranged between the pressure line and the reservoir by means of which the return movement of the tool carrier is made possible. For the purpose of attainment of force conditions which remain as uniform as possible over the entire range of movement of the tool carrier and for the purpose of ever present readiness for the return movement thereof, the return cylinder is in communication with an existing air pressure system, for instance through bores in the housing of the device and through the hollow machine spindle, and is thereby kept under essentially constant overpressure at all times.

For limiting the feed and return movement of the tool carrier, conventional stops may be provided on the housing of the device. Finally the construction in accordance with the present invention provides the possibility of arranging means on the device such as, for instance, centrifugal switches or pressure switches which effect an automatic return of the tool carrier by the operation of the return valve after the machining operation on the work piece has been completed.

The inventive device renders possible the use of such facing and relieving devices for mass production by reasons of the extensively automatic mode of operation thereof combined with simultaneous and essential savings in time by the omission of the lengthy manual resetting of the carrier. It should also be noted in particular that with the device in rotation, no actuating or servicing manipulations are needed thereon whereby the danger of accidents to the operating personnel is practically eliminated.

Accordingly, it is an object of the present invention to provide a feed and control device for machines, such as drilling or milling machines, which is simple in structure, inexpensive to manufacture, and light in weight.

It is another object of the present invention to provide such a control and feed device for rotating spindles of machines which are particularly well suited for mass production by reason of the essentially automatic operation thereof, notwithstanding the utmost simplicity of the construction thereof.

A further object of the present invention resides in the provision of a control and feed device for machines provided with spindles which enables great accuracy in the operation thereof.

Another object of the present invention resides in the provision of a control and feed device which is characterized by greater safety features to the operator due to the omission of any requirement of manipulation by hand of any rotating parts thereof to effect the control.

Another object of the present invention resides in the provision of a control mechanism controlling the feed provision of a control mechanism controlling the feed of machines provided with rotating spindles which enables different feed velocities adjustable at great accuracies as well as speedy resetting of the tool carrier after completing the feed movement thereof.

These and other features, objects and advantages of the present invention will become more obvious from the following description when taken in connection with the accompanying drawing which shows, for purposes of illustration, one preferred embodiment in accordance with the present invention, and wherein:

Figure 1 is a schematic longitudinal cross-sectional view through the feed and control device in accordance with the present invention, and Figure 2 is a side view of Figure 1.

Referring now more particularly to the drawing wherein like reference numerals are used to designate like parts throughout the various views thereof, the rotating hollow spindle designated by reference numeral 1, for instance, of a vertical milling machine, generally designated by reference numeral 2, carries at the lower end thereof the rotating base plate 3 of the device which rotates with the spindle 1. The base plate 3 is fastened to the hollow spindle 1 by a tie or connecting rod 4 disposed in the hollow spindle 1 and threadably secured in the base plate 3. The tool carrier 6 is slidably supported at the under side of the base plate 3 by means of a so-called dove-tail guide 5. The support member 7 for the control plungers or pistons together with the feed plunger or piston 8 and the return plunger or piston 9 is connected with the base plate 3 by the dowel pin 10 of the tie rod 4.

The pump and oil reservoir housing 11 is arranged on the base plate concentrically about the machine spindle 1. This housing 11 includes a plunger or piston pump 12 of the variable displacement type, an oil reservoir 13 provided with an inlet opening 14 and a vent opening 15, as well as a pump suction valve 16, the pressure limiting valve 17 and the controllable return valve 18. The pump discharge valve 19 is built into the base plate 3. A cam 21 for producing the pump stroke movement is screwed onto the stationary spindle bearing ring 20 and is secured therewith by means of a nut 22. The plunger or piston pump 12 is in communication with the feed cylinder 23 over the oil line system 25, whereas the return cylinder 24 is in communication with a pressure air system of conventional construction comprising a pressure source 27 through the hollowed tie rod 4 whereby constant pressure conditions are attained over the entire range of feed movement of the device.

Operation

The mode of operation of the device is as follows: At the beginning of operation the tool carrier 6 is in the position shown in the drawing in Fig. 1. When the spindle 1 and therewith cam 21 are put into rotation, then the feed movement commences automatically which is initiated by the piston pump 12 actuated by the cam 21. For each revolution of the spindle 1, the plunger or piston pump 12 delivers a certain quantity of oil, which quantity, may be regulated by the adjustment of cam 21, out of the oil reservoir 13 through the bores 25 into the base plate 3 and through the control-plunger support member 7 into the feed cylinder 23 which is thereby moved to the left together with the tool carrier 6 and the return cylinder 24 and thereby effects a feed movement of the tool (not shown) fastened to the tool carrier by means of bores 26.

As soon as machining of the given surface is completed, the machine may be shut down. This may be accomplished by operating the return valve 18, for example, automatically by means of conventional stop means (not shown) whereby the oil line system 25 is connected with the oil reservoir 13 after which the oil pressure in the line system 25 drops while the air pressure present in the return cylinder 24 effects an immediate return of the tool carriage 6 to the starting position.

If, for purposes of limiting the feed movement, a conventional stop mechanism is provided, then upon abutment of the tool carrier 6 against the stationary stop provided at the base plate, the oil pressure in the line system 25 rises until the pressure limiting valve 17 is actuated. The occurrence of excessive pressures and forces is thereby effectively prevented also during the machining operation.

While I have shown and described one embodiment in accordance with the present invention, it is understood that the same is not limited thereto but instead is susceptible of many changes and modifications within the spirit of the present invention, and I intend to cover all those changes and modifications as encompassed in the appended claims.

I claim:

1. A control and feed device comprising a hollow rotary spindle a tool carriage mounted on said spindle for movement radially of the axis thereof in feed and return directions, and fluid pressure means for controlling the feed and return movements of said tool carriage including a plurality of pressure cylinder means operatively connected to said tool carriage, each of said pressure cylinder means comprising an element movable radially of the axis of said spindle, a reservoir housing means secured to and rotatable with said spindle containing a fluid pressure medium, a pump mounted on said spindle in communication with said reservoir housing means for supplying said fluid pressure medium to one of said plurality of pressure cylinder means during each revolution of said spindle, said pump having a piston, a member adjustably mounted on said machine and having a cam surface for engaging said piston in response to rotation of said spindle for pumping fluid to said pressure cylinder means.

2. A control and feed device according to claim 1, wherein said feed movement is effected by said pressure fluid medium being pumped to one of said fluid pressure means, said pressure fluid medium being hydraulic, said fluid pressure means further comprising a source of pneumatic pressure operatively connected to another of said plurality of pressure cylinder means for controlling said return movements.

3. A control and feed device according to claim 1, said fluid pressure means including means for supplying pressure to another of said plurality of pressure cylinder means comprising a source of fluid pressure and a tie rod, a longitudinal bore in said tie rod, one end of said bore being connected to said source, the other end of said bore being connected to said another of said plurality of pressure cylinder means.

References Cited in the file of this patent

UNITED STATES PATENTS

| 1,668,919 | Lundstrom | May 8, 1928 |
|---|---|---|
| 1,805,964 | Wallis | May 19, 1931 |
| 1,933,081 | Stephan | Oct. 31, 1933 |
| 2,285,069 | Vickers | June 2, 1942 |
| 2,319,485 | Alabrune | May 18, 1943 |
| 2,367,555 | Arney | Jan. 16, 1945 |
| 2,372,000 | Johanson | Mar. 20, 1945 |
| 2,486,977 | Peters | Nov. 1, 1949 |
| 2,516,495 | Waterson | July 25, 1950 |
| 2,550,391 | Thomas | Apr. 24, 1951 |
| 2,713,493 | Herbst | July 19, 1955 |
| 2,819,639 | Grover | Jan. 14, 1958 |

FOREIGN PATENTS

| 562,562 | Germany | Oct. 27, 1932 |